(12) United States Patent
Yoon et al.

(10) Patent No.: US 9,040,191 B2
(45) Date of Patent: May 26, 2015

(54) RECHARGEABLE BATTERY

(75) Inventors: Ji-Hyoung Yoon, Suwon-si (KR);
Yong-Sam Kim, Suwon-si (KR);
Sang-Min Jeong, Suwon-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 1553 days.

(21) Appl. No.: 12/204,026

(22) Filed: Sep. 4, 2008

(65) Prior Publication Data

US 2009/0087733 A1    Apr. 2, 2009

(30) Foreign Application Priority Data

Oct. 2, 2007 (KR) .......................... 10-2007-0099314

(51) Int. Cl.
*H01M 2/26* (2006.01)
*H01M 2/04* (2006.01)

(52) U.S. Cl.
CPC ............ *H01M 2/263* (2013.01); *H01M 2/0413* (2013.01)

(58) Field of Classification Search
CPC ...................................................... H01M 2/263
USPC ................................................... 429/161, 178
IPC ....................................................... H01M 2/263
See application file for complete search history.

(56) References Cited

U.S. PATENT DOCUMENTS

| | | | | |
|---|---|---|---|---|
| 6,040,086 A | * | 3/2000 | Yoshida et al. | 429/211 |
| 6,653,017 B2 | * | 11/2003 | Satoh et al. | 429/178 |
| 6,884,541 B2 | * | 4/2005 | Enomoto et al. | 429/163 |
| 6,995,333 B2 | * | 2/2006 | Nakanishi et al. | 219/121.14 |
| 2005/0112468 A1 | * | 5/2005 | Berkowitz et al. | 429/231.95 |
| 2005/0244706 A1 | * | 11/2005 | Wu et al. | 429/56 |
| 2005/0287429 A1 | | 12/2005 | Cho et al. | |

FOREIGN PATENT DOCUMENTS

| | | |
|---|---|---|
| CN | 1534819 | 10/2004 |
| EP | 1 134 819 A2 | 9/2001 |
| JP | 49-109127 U | 9/1974 |
| JP | 59-59471 U | 4/1984 |
| JP | 63-086251 A | 4/1988 |
| JP | 2001-093579 A | 4/2001 |

(Continued)

OTHER PUBLICATIONS

Chinese Office Action dated Apr. 13, 2011 for Chinese Patent Application No. CN 200810167406.3 which shares priority of Korean Patent Application No. KR 10-2007-0099314 with the captioned application.

(Continued)

*Primary Examiner* — Maria J Laios (74) *Attorney, Agent, or Firm* — Knobbe, Martens, Olson & Bear, LLP (57) ABSTRACT

A rechargeable battery includes an electrode assembly, a case, a cap assembly, and a current collecting plate. The electrode assembly includes an anode, a cathode, and a separator interposed between the anode and the cathode. The case houses the electrode assembly and has an opening and has a closed end. The cap assembly is coupled to the opening of the case, and is electrically connected to the electrode assembly. The current collecting plate is electrically connected to the anode or the cathode, and has a guide portion. The guide portion bends toward the electrode assembly to be in contact with the electrode assembly.

19 Claims, 10 Drawing Sheets

(56) References Cited

FOREIGN PATENT DOCUMENTS

| | | |
|---|---|---|
| JP | 2001-160387 A | 6/2001 |
| JP | 2002-100342 A | 4/2002 |
| JP | 2002-298906 A | 10/2002 |
| JP | 2003-036833 (A) | 2/2003 |
| JP | 2005-071677 (A) | 3/2005 |
| JP | 2005-142026 A | 6/2005 |
| JP | P2006-331993 | 12/2006 |
| JP | 2007-128746 | 5/2007 |
| JP | 2007-242317 (A) | 9/2007 |
| JP | 2007-242362 | 9/2007 |
| JP | P2007-242317 | 9/2007 |
| WO | WO 2007/142040 A1 | 12/2007 |

OTHER PUBLICATIONS

Office Action issued by the Koran Intellectual Property Office on Mar. 20, 2009.
Office Action dated Jul. 20, 2010 from Chinese Patent Application No. 200810167406.3.
Japanese Office Action dated May 31, 2011 for Japanese Patent Application No. JP 2008-007397 which shares priority of Korean Patent Application No. KR 10-2007-0099314 with captioned U.S. Appl. No. 12/204,026.
Extended European Search Report dated Dec. 8, 2014 for European Patent Application No. EP 08 165 505.2 which shares priority of Korean Patent Application No. KR 10-2007-0099314 with captioned U.S. Appl. No. 12/204,026, and cites the above-identified references numbered 1-5.

* cited by examiner

RECHARGEABLE BATTERY

CROSS-REFERENCE TO RELATED APPLICATIONS

This application claims the benefit of Korean Application No. 2007-99314 filed Oct. 2, 2007, in the Korean Intellectual Property Office, the disclosure of which is incorporated herein by reference.

BACKGROUND OF THE INVENTION

1. Field of the Invention

Aspects of the present invention relate to a rechargeable battery. More particularly, aspects of the present invention relate to a rechargeable battery including a current collecting plate having an improved structure.

2. Description of the Related Art

Rechargeable batteries can be repeatedly charged and discharged, unlike primary batteries, which are incapable of being recharged. Low capacity rechargeable batteries composed of a single cell are generally used for portable small electronic devices, such as mobile phones, laptop computers, and camcorders. Large capacity rechargeable batteries composed of a plurality of cells connected in a form of a pack are widely used to drive motors of hybrid electric vehicles.

A rechargeable battery may be manufactured in various forms. Representative forms of a rechargeable battery include a cylindrical form or a quadrilateral form.

Such rechargeable batteries may be serially connected to form a rechargeable battery module to drive a motor for an electric vehicle, which needs a large amount of electric power.

A typical rechargeable battery includes an electrode assembly having an anode and a cathode with a separator interposed therebetween, a case that provides a space to house the electrode assembly, and a cap assembly that closes and seals the case.

In the case of a rechargeable battery formed in a cylindrical shape, an anode uncoated region and a cathode uncoated region where an active material is not coated are formed at the anode and the cathode of the electrode assembly, respectively. The anode uncoated region and the cathode uncoated region are disposed at opposite ends of the electrode assembly.

A cathode current collecting plate is adhered on the cathode uncoated region, and an anode current collecting plate is adhered on the anode uncoated region. Each of the cathode current collecting plate and the anode current collecting plate is electrically connected to the case or the cap assembly to guide the current to the outside. For example, the cathode electrode current collecting plate may be electrically connected to the case, and the anode current collecting plate may be electrically connected to the cap assembly. Alternatively, the cathode electrode current collecting plate may be electrically connected to the cap assembly, and the anode current collecting plate may be electrically connected to the case.

The case acts as a cathode terminal when the cathode current collecting plate is electrically connected to the case. A cap plate of the cap assembly acts as an anode terminal when the anode current collecting plate is electrically connected to the cap assembly.

The cathode and anode current collecting plates are secured to the cathode uncoated region and the anode uncoated region, respectively, by a method such as welding. To increase the current collecting efficiency, the cathode and anode current collecting plates should be in contact with a large area of their respective uncoated region.

However, conventional current collecting plates cannot be fully welded to the uncoated region at edge regions of the current collecting plates, particularly by laser welding because, when a laser is irradiated at the edge regions of the current collecting plates, the laser may deviate from the current collecting plates and may damage the uncoated region of the anode or cathode.

If the uncoated region located at an edge region of an anode or cathode cannot be connected to the current collecting plate, the output of the rechargeable battery may deteriorate since charges collected at the edge regions cannot move to a current collecting plate.

Meanwhile, it is desirable that the centers of each current collecting plates should be consistently aligned with the center of the electrode assembly when the rechargeable battery is assembled. However, consistent alignment is very difficult because the cross-sections of the current collecting plates are smaller than the cross-section of the electrode assembly.

The above information disclosed in this Background section is only for enhancement of understanding of the background of the invention and therefore it may contain information that does not form the prior art that is already known in this country to a person of ordinary skill in the art.

SUMMARY OF THE INVENTION

Aspects of the present invention provide a rechargeable battery having advantages of having improved current collecting efficiency and high resistance to impact and shock.

According to an embodiment of the present invention, a rechargeable battery includes an electrode assembly, a case, a cap assembly, and a current collecting plate. The electrode assembly includes an anode, a cathode, and a separator interposed between the anode and the cathode. The case houses the electrode assembly and has an opening and a closed end. The cap assembly is coupled to the opening of the case and is electrically connected to the electrode assembly. The current collecting plate is electrically connected to the anode or the cathode, and has a guide portion. The guide portion bends toward the electrode assembly to be in contact with the electrode assembly.

According to an aspect of the present invention, the anode and the cathode may each include an uncoated region that is not coated with an active material, and the uncoated region of the anode or cathode located at an edge region of the electrode assembly may be bent by the guide portion.

According to an aspect of the present invention, the guide portion may include an outer guide portion formed on an outer periphery of the current collecting plate, and the outer guide portion may be continuously formed along the outer periphery of the current collecting plate. The guide portion may have a decreasing thickness toward an edge of the current collecting plate.

According to an aspect of the present invention, the current collecting plate may have a center hole at an inner portion of the current collecting plate, and the guide portion may include an inner guide portion formed on a periphery of the center hole.

According to an aspect of the present invention, the current collecting plate may include at least one welding protrusion protruding toward the electrode assembly, and the at least one welding protrusion may adjoin the guide portion.

According to an aspect of the present invention, the current collecting plate may have a center hole at an inner portion of the current collecting plate. The guide portion may include an inner guide portion formed on a periphery of the center hole and an outer guide portion formed on an outer periphery of the current collecting plate. The current collecting plate may include at least one welding protrusion protruding toward the electrode assembly, and the at least one welding protrusion may extend from the inner guide portion to the outer guide portion.

According to an aspect of the present invention, the rechargeable battery may further include an insulation member. The insulation member may be disposed on a surface of the current collecting plate facing the cap assembly to insulate the current collecting plate from the case. The insulation member may include an outer peripheral supporter surrounding the guide portion.

The case may include a beading portion that curves inwardly, and the insulation member may be in contact with the beading portion.

According to an aspect of the present invention, the outer peripheral supporter may have a decreasing thickness toward an edge of the insulation member. The current collecting plate may include at least one welding groove depressed toward the electrode assembly, and the insulation member may include at least one supporting protrusion to be inserted into the at least one welding groove, respectively. The insulation member may have a plate shape, and may have a reinforcing portion protruding toward the cap assembly at an edge of the insulating member.

According to an aspect of the present invention, the insulation member may have a ring shape. The current collecting plate may include at least one welding groove depressed toward the electrode assembly, and the insulation member may include at least one recess portion corresponding the at least one welding groove, respectively.

According to an aspect of the present invention, the at least one recess portion may open a part of a side of the insulation member. An inner wall of the at least one recess portion is outwardly inclined to a bottom surface of the at least one recess portion.

According to an embodiment of the present invention, since a contact area between the current collecting plate and the uncoated region is increased by the guide portion of the current collecting plate, current collecting efficiency can be improved.

Also, according to an embodiment of the present invention, the center of the current collecting plate can aligned with the center of the electrode assembly by the guide portion when the current collecting plate is secured to the electrode assembly. Thus, the current collecting plate can be easily disposed on and secured to the electrode assembly.

In addition, according to an exemplary embodiment of the present invention, the insulation member disposed on the current collecting plate is secured in a state wherein the beading portion of the case presses the insulation member. Accordingly, the current collecting plate is prevented from moving in response to a shock or a vibration applied from the outside.

Further, according an embodiment of the present invention since the insulation member has a ring shape, the insulation member does not have any specific directional orientation so the insulation member can be easily disposed on and secured to the current collecting plate.

According to an embodiment of the present invention, the insulation member has a recess portion, and thus the current collecting plate can be welded to the insulation member in a state in which the insulation member is disposed on the current collecting plate.

According to another embodiment of the present invention, there is provided a current collecting plate of a cylindrical rechargeable battery having a spirally wound electrode assembly, comprising a plate body; an outer guide portion forming a continuous rim extending arcuately from an outer periphery of the plate body; a center hole or depression in the plate body; and at least one welding protrusion formed in the plate body and extending radially from the center hole to the outer guide portion, the welding protrusion protruding from one side of the plate body such that a complementary welding groove is formed in the other side of the plate body.

According to another embodiment of the present invention, there is provided an assembly of a current collecting plate and insulating member of a cylindrical rechargeable battery having a spirally wound electrode assembly, wherein the current collecting plate comprises a plate body; an outer guide portion forming a continuous rim extending arcuately from an outer periphery of the plate body; a center hole or depression in the plate body; and at least one welding protrusion formed in the plate body and extending radially from the center hole to the outer guide portion, the welding protrusion protruding from one side of the plate body such that a complementary welding groove is formed in the other side of the plate body; and the insulating member comprises an outer peripheral support member that surrounds the outer guide portion of the current collecting plate.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
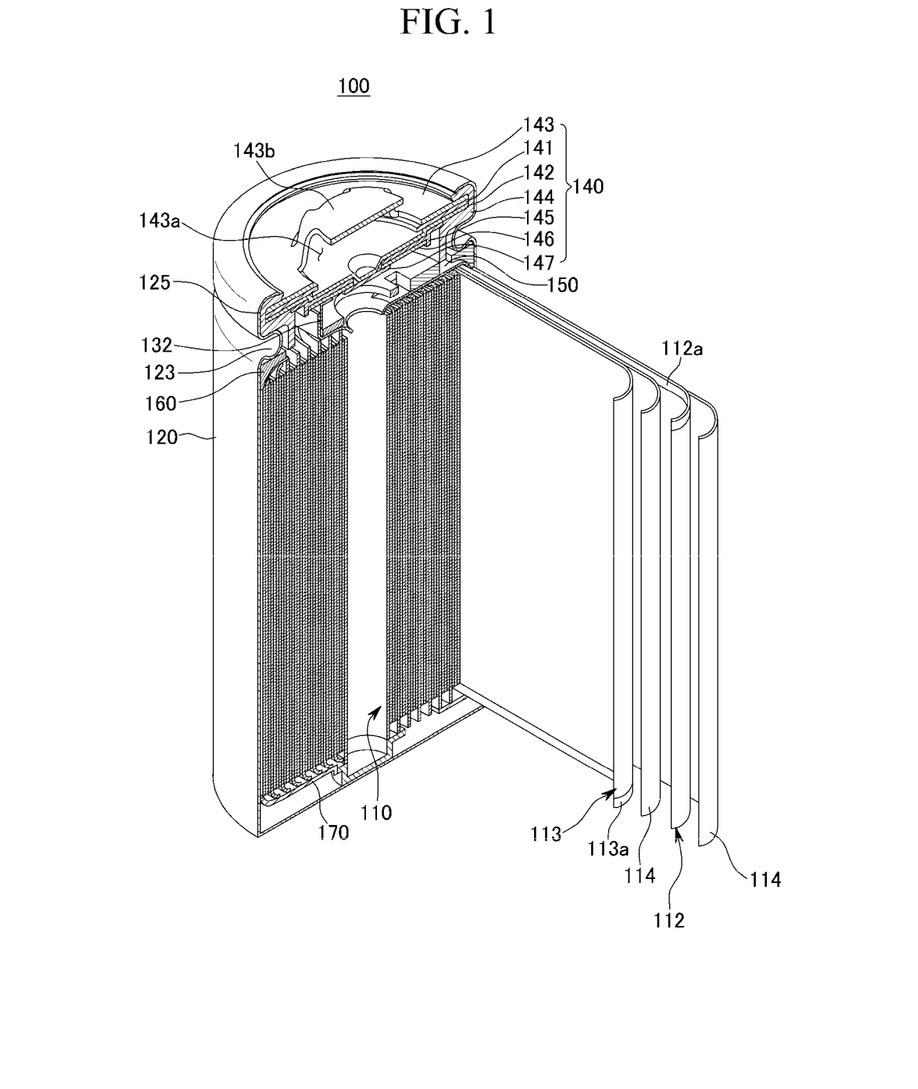
FIG. 1 is a cross-sectional perspective view of a rechargeable battery according to an embodiment of the present invention, including a partially exploded view of the electrode assembly of the rechargeable battery.

FIG. 1 is a cross-sectional perspective view of a rechargeable according to a first exemplary embodiment of the present invention, including a partially exploded view of the electrode assembly of the rechargeable battery. Referring to the FIG. 1, the rechargeable battery 100 according to the present exemplary embodiment includes an electrode assembly 110 and a case 120. The electrode assembly 110 has an anode 112, a cathode 113, and a separator 114 interposed between the anode 112 and the cathode 113. The separator 114 is also disposed external to the outermost portion of the anode 112. The case 120 has an opening formed at one end thereof to insert the electrode assembly 110 with an electrolyte solution. A cap assembly 140 is disposed at the opening of the case 120, with a gasket 144 interposed therebetween.

As used herein, directional or orientational terms such as "upper," "lower," "top," and "bottom" may be interpreted from the viewpoint of the open end of the case 120 being the top end of the battery and the closed end of the case 120 being the bottom end of the battery, such as in the case where the battery stands on its closed end. Moreover, terms such as "outer" and "inner" may be understood with reference to the cylindrical axis of the battery case.

The case 120 is formed of a conductive metal such as steel coated with aluminum, an aluminum alloy, or nickel.

The case 120 according to the present embodiment is formed in a cylindrical shape having an internal space to house the electrode assembly 110. After inserting the cap assembly 140 into the opening of the case 120, the cap assembly 140 is secured to the case 120 through a clamping process. In the clamping process, a beading portion 123 that is curved inwardly and a clamping portion 125 that is folded inwardly above the beading portion 123 are formed.

The electrode assembly 100 according to the present embodiment is also formed in a cylindrical shape. That is, a first portion of the separator 114, the anode 112, a second portion of the separator 114, and the cathode 113 are sequentially stacked, and the stack is spirally rolled to form the electrode assembly 110 in a cylindrical shape. However, the electrode assembly 110 structure is not limited thereto, and can be formed in various ways.

An anode uncoated region 112a, that is, a region of the anode 112 that is not coated with an anode active material, is formed at an upper end (in a case in which the rechargeable battery 100 stands so that the cap assembly 140 is upward) of the anode 112. The anode 112 is electrically connected to an anode current collecting plate 150 through the anode uncoated region 112a. A cathode uncoated region 113a, that is, a region of the cathode 113 that is not coated with a cathode active material, is formed at a lower end of the cathode 113 (that is, the end of the cathode that is closest to the closed end of the case 120). The cathode 113 is electrically connected to a cathode current collecting plate 170 through the cathode uncoated region 113a.

In the present embodiment, the anode current collecting plate 150 is disposed at the upper portion, and the cathode electrode current collecting plate 170 is disposed at the lower portion. However, the present invention is not limited thereto. Thus, as an alternative, the anode current collecting plate can be disposed at the lower portion, and the cathode electrode current collecting plate can be disposed at the upper portion.

The cap assembly 140 includes a cap plate 143 having a protruded outer terminal 143b and an exhaust port 143a, and a vent plate 142 disposed under the cap plate 143 for discharging gas by being broken when a predetermined pressure condition is satisfied. The vent plate 142 interrupts the electrical connection between the electrode assembly 110 and the cap plate 143 if the predetermined pressure condition occurs.

A positive temperature coefficient element 141 is disposed between the cap plate 143 and the vent plate 142. The positive temperature coefficient element 141 unlimitedly increases the electrical resistance when the temperature rises above a predetermined temperature. When the rechargeable battery 100 reaches a temperature higher than a predetermined value, the positive temperature coefficient element 141 interrupts the flow of current for charging and discharging.

The vent plate 142 protrudes downwardly, and a sub-plate 147 is attached at the bottom side of the protruding part.

A middle plate 146 is inserted in the protruding portion of the vent plate 142 to be disposed on the vent plate 142. The middle plate 146 is electrically connected to the anode current collecting plate 150 through a lead unit 132. An insulator 145 is disposed between the middle plate 146 and the vent plate 142 to insulate the middle plate 146 from the vent plate 142.

An insulation member 160 is disposed on the anode current collecting plate 150 to insulate the current collecting plate 150 from the case 120. The insulation member 160 is disposed below the beading portion 123 to surround an outer periphery of the anode current collecting plate 150. In the present embodiment, the insulation member 160 is in contact with the bottom of the beading portion 123 to support and fix the anode current collecting plate 150. Accordingly, since the insulation member 160 supports the anode current collecting plate 150, deterioration of the electrical contact between the anode current collecting plate 150 and the anode uncoated region 112a can be prevented, even if a shock or a vibration is applied in an up-and-down direction to the rechargeable battery 100.

Figure 2:
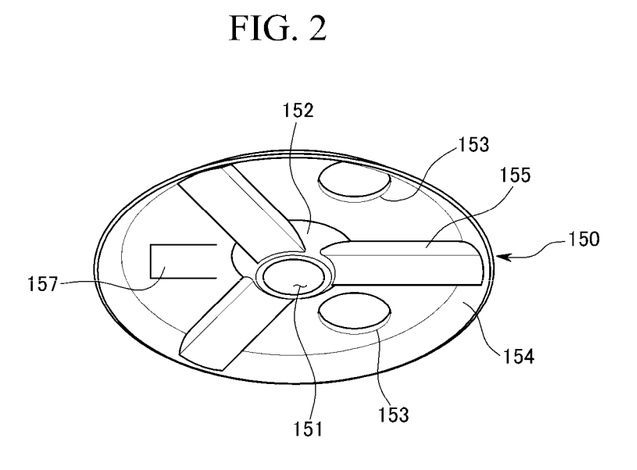
FIG. 2 is a perspective bottom view of an anode current collecting plate and FIG. 3 is a perspective bottom view of an insulation member according to an embodiment of the present invention.

FIG. 2 is a perspective bottom view of the anode current collecting plate 150. Referring to FIG. 2, the anode current collecting plate 150 has a round shape, corresponding to the cylindrical cross-sectional shape of the rechargeable battery 100. A center hole 151 is formed at the center of the anode current collecting plate 150. Welding protrusions 155 are formed on a bottom surface of the anode current collecting plate 150. The welding protrusions 155 extend in a radial direction from the center hole 151 toward an outer periphery of the anode current collecting plate 150. The welding protrusions 155 are formed by bending the anode current collecting plate 150. Thus, corresponding welding grooves 156 (see FIG. 4) are formed on the surface of the anode current collecting plate 150 opposite to the welding protrusions 155.

In the present exemplary embodiment, three welding protrusions 155 are formed on the anode current collecting plate 150. However, the present invention is not limited thereto, and the number and size of the welding protrusions 155 can be varied. The welding protrusions 155 press against and bend the anode uncoated region 112a. In this state, the welding protrusions 155 are secured to the anode uncoated region 112a by welding. Accordingly, a contact area between the anode uncoated region 112a and the anode current collecting plate 150 increases.

Between the welding protrusions 155, ventilations holes 153 are formed so that gas generated from the electrode assembly 110 can escape. A tab part 157 is formed between a pair of the welding protrusions 155. The tab part 157 is connected to the lead unit 132 to electrically connect the cap assembly 140 to the anode current collecting plate 150.

An outer guide portion 154 is formed at an outer periphery of the anode current collecting plate 150. The outer guide portion is bent toward the anode uncoated region 112a. The outer guide portion 154 is continuously formed along the outer periphery of the anode current collecting plate 150, and is curved toward the anode uncoated region 112a with an arc shape. An inner guide portion 152, also curved toward the anode uncoated region 112a, is formed on a periphery of the center hole 151.

The outer guide portion 154 and the inner guide portion 152 collect and guide portions of the anode uncoated region 112a located at an external edge and an inner edge. That is, when the anode current collecting plate 150 is disposed on and secured to the anode uncoated region 112a, the portion of the anode uncoated region 112a located at the outer edge region of the electrode assembly is bent and guided toward an inside of the anode current collecting plate 150 by the outer guide portion 154 and the portion of the anode uncoated region 112a located at the inner region of the electrode assembly are guided outwardly from the center hole 151 by the inner guide portion 152. The anode uncoated region 112a located at the edge regions are guided to contact the welding protrusions 155, and thus the contact area between the anode current collecting plate 150 and the anode uncoated region 112a increases even more.

Figure 3:
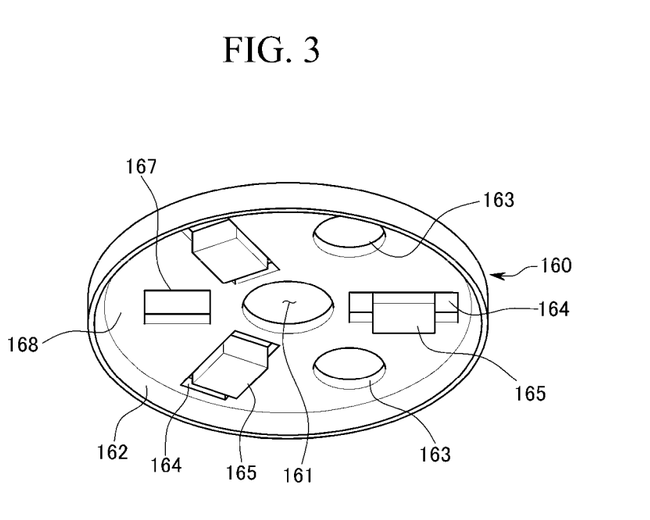
Figure 4:
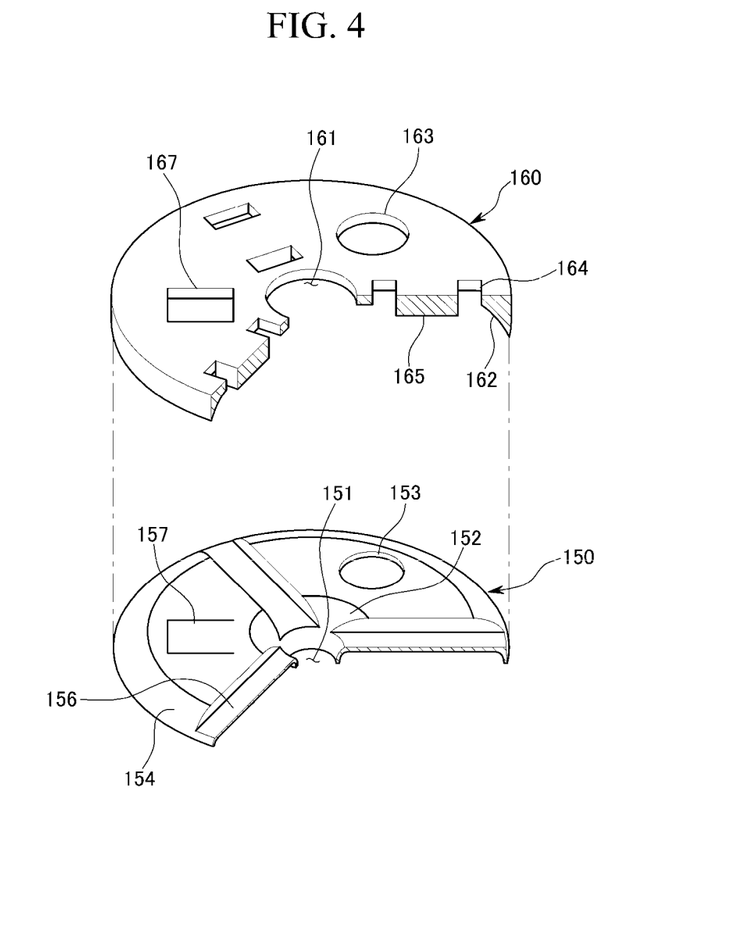
FIG. 4 is an exploded perspective view of the anode current collecting plate and the insulation member shown in FIGS. 2 and 3.
Figure 5:
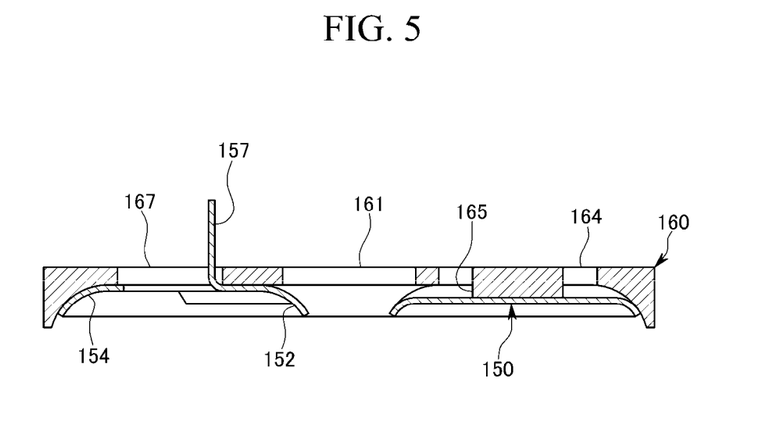
FIG. 5 is a cross-sectional view of the anode current collecting plate and the insulation member shown in FIG. 4 when the anode current collecting plate and the insulation member are assembled.

FIG. 3 is a perspective bottom view of an insulation member 160 according to the present embodiment, and FIG. 4 is an exploded perspective view of the anode current collecting plate 150 and the insulation member 160 according to the present embodiment. FIG. 5 is a cross-sectional view of the anode current collecting plate 150 and the insulation member 160 when the anode current collecting plate 150 and the insulation member 160 are assembled Hereinafter, the insulation member 160 will be described more fully with reference to FIGS. 3, 4 and 5. The insulation member 160 includes a plate 168 having a round shape corresponding to the shape of the anode current collecting plate 150. An outer peripheral supporter 162 is continuously formed at the outer edge or periphery of the plate 168. As shown in FIG. 5, the outer peripheral supporter 162 surrounds the outer guide portion 154 of the current collecting plate 150 to insulate the anode current collecting plate 150 from the case 120.

A center hole 161 is formed at the center of the insulation member 160. Supporting protrusions 165 are formed on a bottom surface of the insulation member 160 in the area between the center hole 161 and the outer periphery of the insulation member 160. The supporting protrusions 165 fit into the welding grooves 156 formed on the upper surface of the anode current collecting plate 150, and thus support the anode current collecting plate 150. Through holes 164 are formed at both ends in a length direction of the supporting protrusions 165.

Between the supporting protrusions 165, ventilation holes 163 are formed so that gas generated from the electrode assembly 110 can escape. A tab hole 167 is formed between a pair of the supporting protrusions 165 to receive the tab part 157 of the anode current collecting plate 150 when tab part 157 is bent upward, as shown in FIG. 5.

When the anode current collecting plate 150 includes the inner and outer guide portions 152 and 154, the inner and outer guide portions 152 and 154 collect the anode uncoated region 112a located at edge regions toward an inside of the anode current collecting plate 150. Thus, a contact area of the anode current collecting plate 150 and the anode uncoated region 112a increases. Particularly, because the welding protrusions 155 are continuously formed from the inner guide portion 152 to the outer guide portions 154, the anode uncoated region 112a, which is bent and guided toward the inside of the anode current collecting plate by the inner and outer guide portions 152 and 154, can be secured to the welding protrusions 155 by a welding method.

In addition, the insulation member 160 is held in place by the beading portion 123 of the case 120 of the rechargeable battery 100 and supports the current collecting plate 150. Thus, the insulation member 160 may excellently prevent the current collecting plate 150 from separating from the anode uncoated region 112a by a shock or a vibration in the up-and-down direction.

Furthermore, when the anode current collecting plate 150 is assembled with the electrode assembly 110, the center of the anode current collecting plate 150 and the center of the electrode assembly 110 are held in alignment by the guide portions 152 and 154. Thus, the anode current collecting plate 150 can be easily disposed on and secured to the electrode assembly 110.

Figure 6:
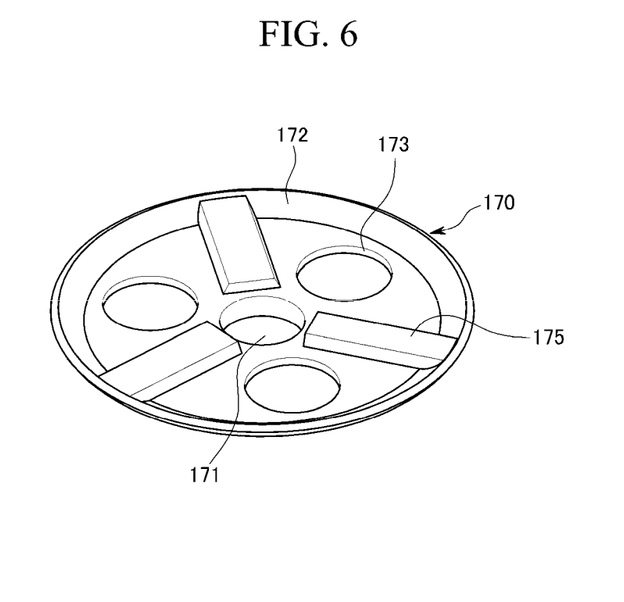
FIG. 6 is a perspective view of a cathode current collecting plate according to an embodiment of the present invention.

FIG. 6 is a perspective view of a cathode current collecting plate 170 according to an embodiment of the present invention. Referring to FIGS. 1 and 6, the cathode current collecting plate 170 has a bottom protrusion 171 and welding protrusions 175. The bottom protrusion 171 is formed at the center of the cathode current collecting plate 170 and protrudes toward the bottom of the case 120. The welding protrusions 175 are continuously formed from the bottom protrusion 171 to an outer periphery of the cathode current collecting plate 170 and protrude toward the cathode uncoated region 113a. Through holes 173 are formed between the welding protrusions 175 such that an electrolyte at a bottom portion of the case 120 can freely move. An outer guide portion 172 is formed at an outer periphery of the cathode electrode current collecting plate 170 and is curved toward to the cathode uncoated region 113a. The outer guide portion 172 collects and guides an outer portion of the cathode uncoated region 113a toward the center of the case 120. Therefore, the contact area between the cathode uncoated region 113a and the welding protrusions 175 increases.

Figure 7:
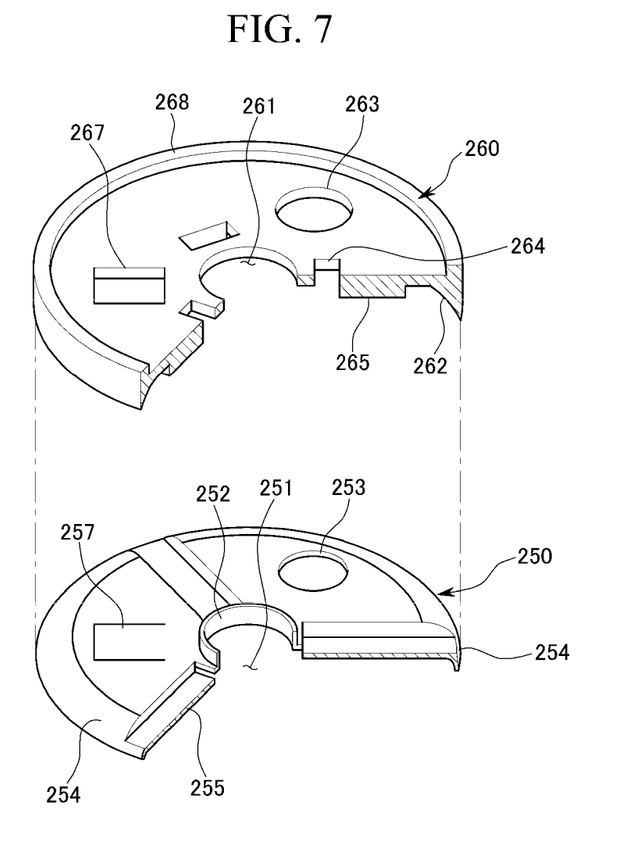
FIG. 7 is an exploded perspective view of an anode current collecting plate and an insulation member according to another embodiment of the present invention.
Figure 8:
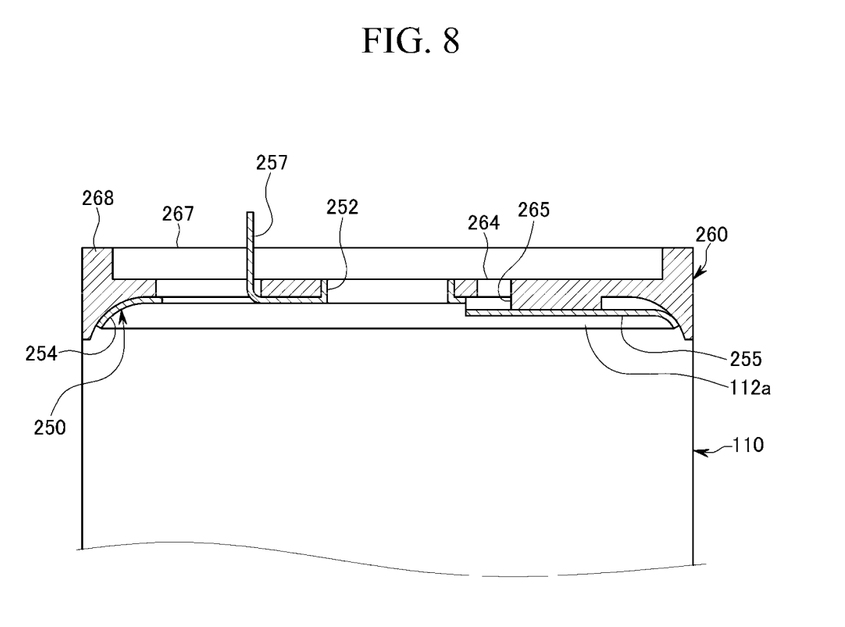
FIG. 8 is a cross-sectional view of an anode current collecting plate, an insulation member 260 and a portion of the electrode assembly in a state that the anode current collecting plate and the insulation member shown in FIG. 7 are secured to the electrode assembly.

FIG. 7 is an exploded perspective view of an anode current collecting plate 250 and an insulation member 260 according to another embodiment of the present invention. FIG. 8 is a cross-sectional view of the anode current collecting plate 250 and an insulation member 260 and a portion of the electrode assembly 110 in a state in which the anode current collecting plate 250 and the insulation member 260 shown in FIG. 7 are secured to the electrode assembly 110.

Referring to FIGS. 7 and 8, an anode current collecting plate 250 according to the present embodiment has ventilation holes 253, and a tab part 257 that is bent upward. Also, a center hole 251 is formed at the center of the anode current collecting plate 250. A securing protrusion 252 protrudes toward an insulation member 260 on a periphery of the center hole 251. An outer guide portion 254 is formed on an outer periphery of the anode current collecting plate 250 and is curved toward the anode uncoated region 112a to guide an outer portion of the anode uncoated region 112a toward the inside of the anode current collecting plate 250.

The insulation member 260 includes a center hole 261, ventilation holes 263, and supporting protrusions 265. The center hole 261 is formed at the center of the insulation member 260. The supporting protrusions 265 fit into grooves formed at an opposite surface of the welding protrusions 255 on the anode current collecting plate 250. An outer peripheral supporter 262 is formed at the outer edge. Through holes 264 are formed inside the supporting protrusions 265. Between the supporting protrusions 265, a tab hole 267 is formed to receive a tab part 257 of the anode current collecting member 250.

A reinforcing portion 268 is formed on a periphery of the insulation member 260. The reinforcing portion 268 is below the beading portion 123 of the case 120 (refer to FIG. 1), and absorbs a shock or an impact by a pressure applied in a clamping process in the formation of the rechargeable battery 100. In addition, the reinforcing portion 268 prevents the insulation member 260 from being twisted by an external force.

Figure 9:
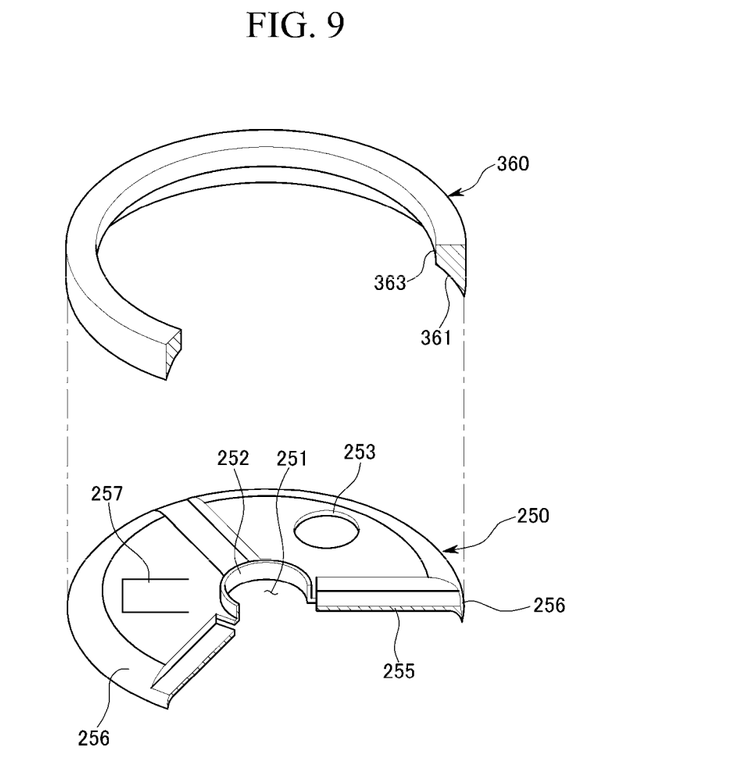
FIG. 9 is an exploded perspective view of an anode current collecting plate and an insulation member according to another embodiment of the present invention.
Figure 10:
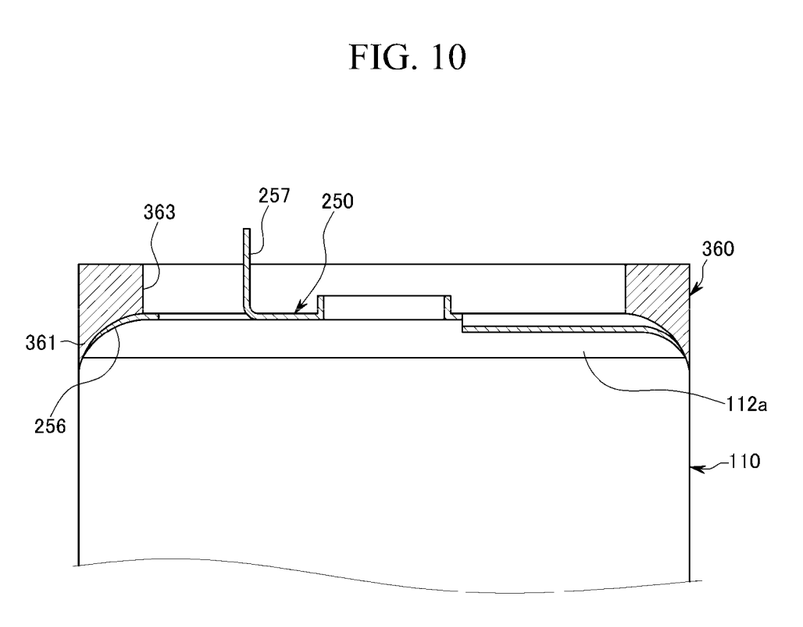
FIG. 10 is a cross-sectional view of an electrode assembly in a state in which the anode current collecting plate and the insulation member shown in FIG. 9 are secured to the electrode assembly.

FIG. 9 is an exploded perspective view of an anode current collecting plate 250 and an insulation member 360 according to another embodiment of the present invention. FIG. 10 is a cross-sectional view of the anode current collecting plate 250 and an insulation member 360 and a portion of the electrode assembly 110 in a state in which the anode current collecting plate 250 and the insulation member 360 shown in FIG. 9 are secured to the electrode assembly 110.

An anode current collecting plate 250 of the FIG. 9 has a similar structure to the anode current collecting plate 250 of the embodiment of FIG. 7. Thus, a detailed description of the construction is not repeated.

The current collecting plate 250 of FIG. 9 has an outer guide portion 256 at an edge thereof. The outer guide portion 256 is curved toward an electrode assembly 110. The outer guide portion 256 has a decreasing thickness toward an edge of the anode current collecting plate 250.

With this structure, the anode current collecting plate 250 can contact the anode uncoated region 112a located at edge regions, without protruding outside of the electrode assembly 110. If an anode current collecting plate protrudes outside the electrode assembly, an unnecessary space corresponding to a thickness of the anode current collecting plate exists. On the other hand, in the present embodiment, the unnecessary space can be decreased. In the present embodiment, the anode current collecting plate 250 is described as an example. A cathode electrode current collecting plate may also have the same structure as the anode current collecting plate of the present embodiment. That is, a cathode electrode current collecting plate of the rechargeable battery 100 may also have an outer guide portion that is curved toward the electrode assembly 110 and that has a decreasing thickness toward an edge of the cathode current collecting plate.

The insulation member 360 has a ring shape and includes a supporting portion 363 and a close contact portion 361. The supporting portion 363 is formed at an upper portion of the insulation member 360, and the close contact portion 361 is formed below the supporting portion 363. The close contact portion 361 corresponds to an edge of an outer surface of the anode current collecting plate 250 so that the outer guide portion 256 of the anode current collecting plate 250 can be inserted into and secured by the close contact portion 361. In the present embodiment, the outer surface of the anode current collecting plate 250 is curved downward, and the close contact portion 361 has a corresponding shape. Thus, a vertical cross-section of an inner surface in the close contact portion 361 has an arc shape.

The close contact part 361 has a thickness that gradually decreases in the direction of the electrode assembly 110. Accordingly, an unnecessary inner space of the case 120 (see FIG. 1), that is formed by a thickness of the insulation member 360 can be decreased. Particularly, the spirally wound electrode assembly 110 can extend farther into the remainder portion and thus, the output of the rechargeable battery can be improved.

In addition, the anode current collecting plate 250 can be stably insulated from the case 120 in the present embodiment, because the insulation member 360 has a ring shape. Also, since there are no directional differences when the insulation member 360 and the anode current collecting plate 250 are assembled, the insulation member 360 can be easily assembled with the anode current collecting plate 250 without the need to worry about orienting the insulation member 360.

Figure 11:
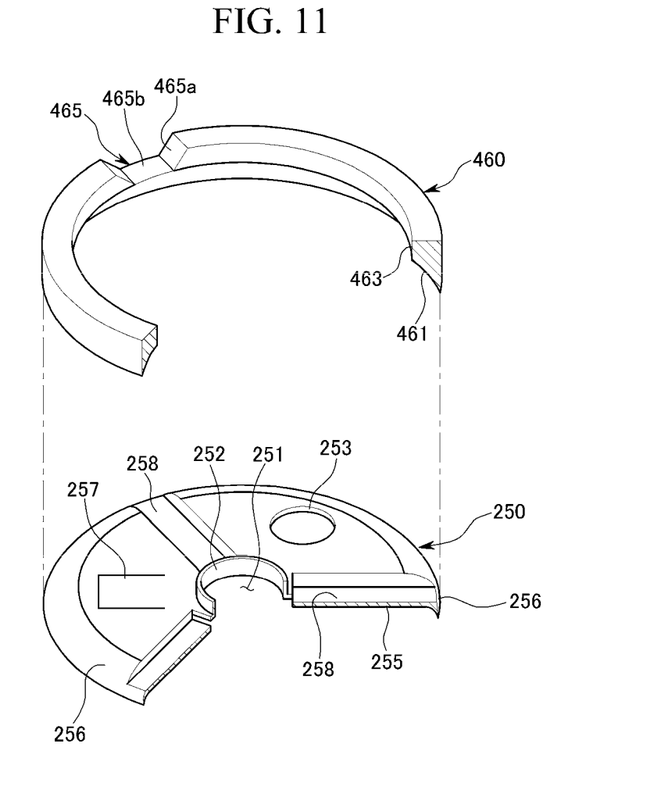
FIG. 11 is an exploded perspective view of an anode current collecting plate and an insulation member according to another embodiment of the present invention.
Figure 12:
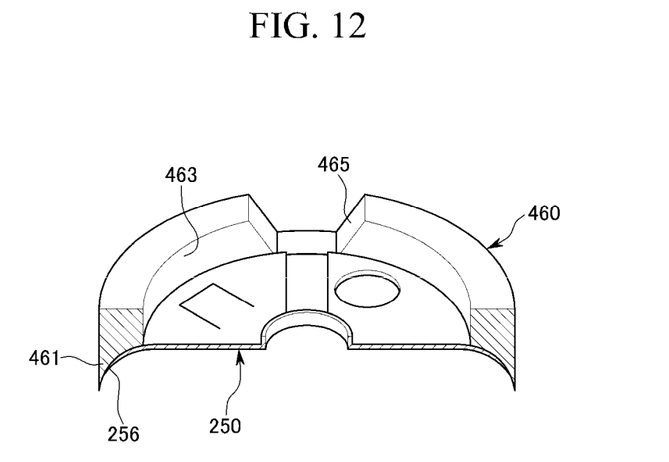
FIG. 12 is a cross-sectional perspective view of the anode current collecting plate and the insulation member shown in FIG. 11 when they are assembled.

FIG. 11 is an exploded perspective view of an anode current collecting plate 250 and an insulation member 460 according to another embodiment of the present invention. FIG. 12 is a cross-sectional perspective view of the anode current collecting plate 250 and the insulation member 460 shown in FIG. 11 when the anode current collecting plate 250 and the insulation member 460 are assembled.

The anode current collecting plate 250 of the embodiment of FIGS. 11 and 12 has a similar structure to the anode current collecting plate of the embodiment of FIG. 9. Thus, a detailed description of the anode current collecting plate 250 is not repeated.

The insulation member 460 has a ring shape and includes a supporting portion 463 and a close contact portion 461. The supporting portion 463 is formed at an upper portion of the insulation member 460, and the close contact portion 461 is formed below the supporting portion 463. The close contact part 461 corresponds to an edge of an outer surface of the anode current collecting plate 350 so that the outer guide portion 256 of the anode current collecting plate 350 can be inserted into and secured by the close contact portion 461. In the present embodiment, the outer surface of the anode current collecting plate 250 is curved downward, and the close contact portion 461 has a corresponding shape. Thus, a vertical cross-section of an inner surface in the close contact portion 461 has an arc shape. The close contact portion 461 has a thickness that gradually decreases toward the electrode assembly 110.

Recess portions 465 are formed on the insulation member 460. The recess portions 465 correspond to welding grooves 258 that are formed at a top surface opposite to a bottom surface of the current collecting plate 250 where welding protrusions 255 are formed. In a welding process, a laser is irradiated onto the welding grooves 258 when the anode current collecting plate 250 is secured to the electrode assembly 110 so as to weld the anode uncoated region 112a and the anode current collecting plate 250. In the present embodiment, because the recess portions 465 are formed at the insulation member 460, the welding can be carried out after the insulation member 460 has been secured to the anode current collecting plate 250. In order to achieve this, bottom surfaces 465b of the recess portions 465 extend below a bottom surface of the welding grooves 258.

The recess portions 465 open a part of a side of the insulation member 460. The recess portions 465 have inner side walls 465a that are outwardly inclined to the bottom surface 465b of the recess portion 465. As a non-limiting example, the inclined angles between the inner side walls 465a and the bottom surface 465a may be 30° to 60°.

Since the inner side walls 465a are inclined towards the bottom surface 465a in this way, interference between the inner side walls 465a and a laser can be prevented. If the inclined angles are less than 30°, the laser and the inner side walls 465a may interfere with each other. If the inclined angle is more than 60°, the strength of the insulation member 465 may be worsened.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A rechargeable battery comprising:
an electrode assembly including an anode, a cathode, and a separator interposed between the anode and the cathode;
a case housing the electrode assembly and having an opening;
a cap assembly coupled to the opening of the case and electrically connected to the electrode assembly; and
at least one current collecting plate electrically connected to the anode or the cathode and having a guide portion, the guide portion bending toward the electrode assembly to be in contact with the electrode assembly, wherein the guide portion comprises:
an outer guide portion continuously formed at an outer periphery of the current collecting plate, wherein the outer guide portion is configured to guide a portion of the anode or cathode away from the outer periphery, and
an inner guide portion continuously formed at an inner periphery of the current collecting plate, wherein the inner guide portion is configured to guide a portion of the anode or cathode away from the inner periphery,
wherein the current collecting plate includes at least one welding protrusion that protrudes toward the electrode assembly and continuously extends from the inner guide portion to the outer guide portion.

2. The rechargeable battery of claim 1, comprising a first current collecting plate between the electrode assembly and a closed end of the case and electrically connected to the cathode and a second current collecting plate between the electrode assembly and the opening of the case and electrically connected to the anode.

3. The rechargeable battery of claim 1, comprising a first current collecting plate between the electrode assembly and a closed end of the case and electrically connected to the anode and a second current collecting plate between the electrode assembly and the opening of the case and electrically connected to the cathode.

4. The rechargeable battery of claim 1, wherein:
the anode and the cathode each include an uncoated region that is not coated with an active material, and
the uncoated region of the anode or cathode located at an edge region of the electrode assembly is bent by the guide portion.

5. The rechargeable battery of claim 1, wherein:
the guide portion has a decreasing thickness toward an edge of the current collecting plate.

6. The rechargeable battery of claim 1, wherein:
the at least one welding protrusion adjoins the guide portion.

7. The rechargeable battery of claim 6, wherein:
the anode and the cathode each include an uncoated region that is not coated with an active material, and
the uncoated region of the anode or cathode that contacts the current collecting plate is bent by the welding protrusion.

8. The rechargeable battery of claim 1, wherein:
the current collecting plate has a center hole at an inner portion of the current collecting plate,
wherein the inner guide portion is formed on a periphery of the center hole.

9. The rechargeable battery of claim 8, wherein:
the anode and the cathode each include an uncoated region that is not coated with an active material, and
the uncoated region of the anode or cathode that contacts the current collecting plate is bent by the welding protrusion.

10. The rechargeable battery of claim 1, further comprising:
an insulation member disposed on a surface of the current collecting plate facing the cap assembly to insulate the current collecting plate from the case.

11. The rechargeable battery of claim 10, wherein:
the case includes a beading portion that curves inwardly, and wherein the insulation member is in contact with the beading portion.

12. The rechargeable battery of claim 11, wherein the beading portion is formed by a clamping process in the forming of the rechargeable battery.

13. The rechargeable battery of claim 10, wherein:
the insulation member includes an outer peripheral supporter surrounding the guide portion of the current collecting plate.

14. The rechargeable battery of claim 13, wherein:
the outer peripheral supporter has a thickness that decreases toward an edge of the insulation member.

15. The rechargeable battery of claim 10, wherein:
the insulation member includes at least one supporting protrusion inserted into the at least one welding groove.

16. The rechargeable battery of claim 10, wherein:
the insulation member has a plate shape and has a reinforcing portion that protrudes toward the cap assembly at an edge of the insulating member.

17. The rechargeable battery of claim 10, wherein:
the insulation member has a ring shape.

18. The rechargeable battery of claim 17, wherein:
the insulation member includes at least one recess portion corresponding to the at least one welding groove.

19. The rechargeable battery of claim 18, wherein:
the at least one recess portion opens a part of a side of the insulation member, and an inner wall of the at least one recess portion is outwardly inclined to a bottom surface of the at least one recess portion.

* * * * *